United States Patent
Cannell et al.

(10) Patent No.: US 6,850,604 B2
(45) Date of Patent: Feb. 1, 2005

(54) METHOD AND SYSTEM FOR SENDING A DATA MESSAGE TO A CALLING PHONE WHILE COMMUNICATING WITH A FIRST PHONE

(75) Inventors: Lynell Earline Cannell, Naperville, IL (US); Eric Harold Henrikson, Redmond, WA (US); Donna Michaels Sand, Redmond, WA (US)

(73) Assignee: Lucent Technologies Inc., Murray Hill, NJ (US)

(*) Notice: Subject to any disclaimer, the term of this patent is extended or adjusted under 35 U.S.C. 154(b) by 154 days.

(21) Appl. No.: 09/871,266

(22) Filed: May 31, 2001

(65) Prior Publication Data

US 2002/0181674 A1 Dec. 5, 2002

(51) Int. Cl.[7] .............................................. H04M 11/00
(52) U.S. Cl. ............................... 379/93.01; 379/93.35; 379/207.01; 455/567
(58) Field of Search ........................... 379/88.01, 88.13, 379/88.17, 88.2, 93.01, 93.04, 93.17–93.18, 93.21, 93.35, 142.08, 207.01, 215.01, 208.01, 202.01; 455/466, 528, 550, 566–567

(56) References Cited

U.S. PATENT DOCUMENTS

| 5,680,447 A | * | 10/1997 | Diamond et al. ...... 379/215.01 |
| 5,764,748 A | * | 6/1998 | Rosenthal et al. ..... 379/215.01 |
| 5,894,504 A | * | 4/1999 | Alfred et al. ............ 379/88.13 |
| 6,047,057 A | * | 4/2000 | Weishut et al. ........ 379/215.01 |
| 6,185,433 B1 | * | 2/2001 | Lele et al. ................... 455/528 |
| 6,219,413 B1 | * | 4/2001 | Burg ..................... 379/215.01 |
| 6,404,860 B1 | * | 6/2002 | Casellini .................. 379/88.17 |
| 6,418,216 B1 | * | 7/2002 | Harrison et al. ....... 379/208.01 |

* cited by examiner

Primary Examiner—George Eng
(74) Attorney, Agent, or Firm—John B. MacIntyre

(57) ABSTRACT

The present invention provides a method and communication system for sending a data message from a called phone to a calling phone while maintaining an active communication between the called phone and a first phone. The calling phone sends a call request to the called phone while the called phone is involved in an active communication with the first phone. The called phone sends a data message to the calling phone in response to the call request. The data message is sent while maintaining an active call with the first phone, so that the first phone is not placed "on hold".

15 Claims, 2 Drawing Sheets

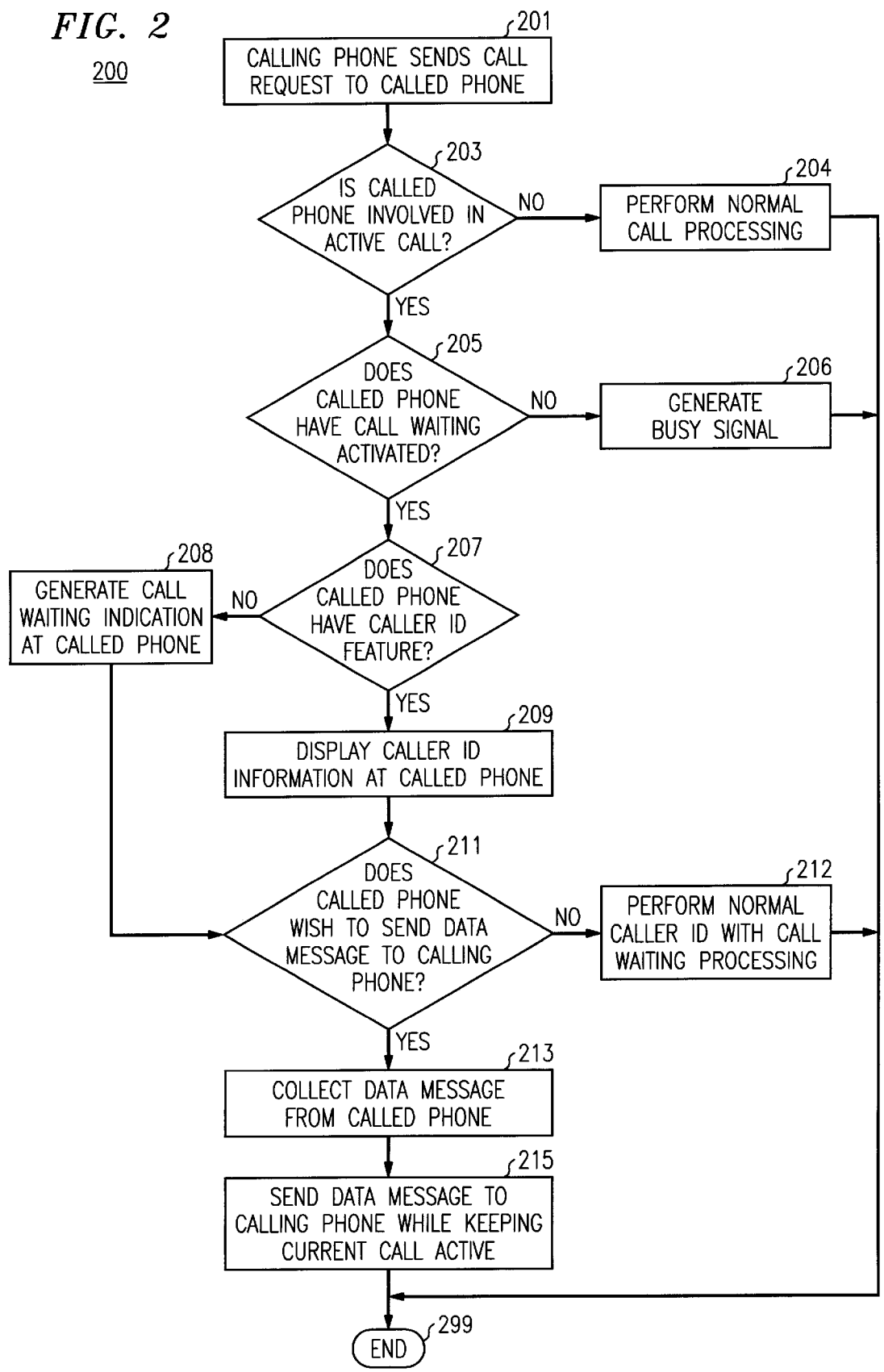

METHOD AND SYSTEM FOR SENDING A DATA MESSAGE TO A CALLING PHONE WHILE COMMUNICATING WITH A FIRST PHONE

FIELD OF THE INVENTION

The present invention relates generally to communication systems, and more particularly to a method for sending a message to a calling phone while engaged in an active communication with a first phone.

BACKGROUND OF THE INVENTION

In current communication systems, a signal can be sent to a phone that alerts the user of the phone of an incoming call when the user is engaged in a current call. This feature, commonly known as call-waiting, allows the user of the called phone the ability to place the first call on hold while answering the call request.

If the called phone has the necessary equipment, the called phone can receive additional data about the calling party. This feature, known as caller ID, is a service that sends the caller's telephone number to the party that is being called.

These features can be combined in a feature known as caller ID with call waiting. This feature requires the called phone to have the necessary equipment for the receiving and display of the call waiting information, as well as subscription to the caller ID with call waiting service from the service provider. In call waiting with caller ID, the called phone, when engaged in an active communication with a first phone, receives an audible alert when a call request arrives from a calling phone. In addition, the called phone receives, preferably via in-band signaling, the name and phone number of the party that subscribes for phone service using this particular calling phone. This information typically includes the name and directory number associated with the calling phone.

There are circumstances when a called phone receives a call waiting with caller ID request when it is an inopportune time to place the first phone on hold while switching to an active communication with the calling party. In current systems, the user of the called phone must either answer the call request, which is disadvantageous for the active call with the first phone, or ignore the call request, in which case the calling phone will either not complete the call or will be placed in the voice mailbox of the called phone. In either scenario, one user with which the called phone wished to communicate with will be denied active communication with the called phone.

Therefore, a need exists for a method and system that allows a called phone to be able to communicate with a calling party without disrupting an active call with a first phone.

BRIEF SUMMARY OF THE INVENTION

It is an object of the present invention to provide a method and communication system for allowing a phone to communicate with a calling phone while engaged in an active communication with a first phone. While engaged in an active communication with a first phone, the called phone receives a call request from a calling phone. The call request is typically in the form of a call waiting with caller ID request.

The called phone then determines an appropriate response to the call request. A first option is to ignore the call request, which will either leave the calling phone ringing or send the calling phone to the voice mail of the called phone. A second option is to place the first phone on hold, as in the prior art, and begin an active communication with the calling phone. A third option proposed by the present invention is to send a data communication to the calling phone while maintaining the active communication with the first phone.

The data message can be generated contemporaneously by the called phone, or can be retrieved from a prerecorded set of data messages. The calling phone can in turn send a response data message to the called phone in response to the data message.

The data message can be an invitation by the called phone for the calling phone to join the active communication. This would effectively bridge the calling phone into a three-way conference call with the called phone and the first phone. This occurs without placing the first phone on hold or interrupting the active communication with the first phone. The invitation may be for a higher or lower Quality of Service (QoS) call than the calling party requested.

Thus, the present invention provides a method and communication system for allowing a user to communicate with a calling party without disrupting a current call with a first phone. In this manner, communication can occur between a calling phone and a called phone without placing the first phone on hold.

BRIEF DESCRIPTION OF THE SEVERAL VIEWS OF THE DRAWINGS

FIG. 2 depicts a flow chart of a call flow for sending a data message from a called phone to a calling phone while communicating with a first phone in accordance with the present invention.

DETAILED DESCRIPTION OF THE INVENTION

Figure 1:
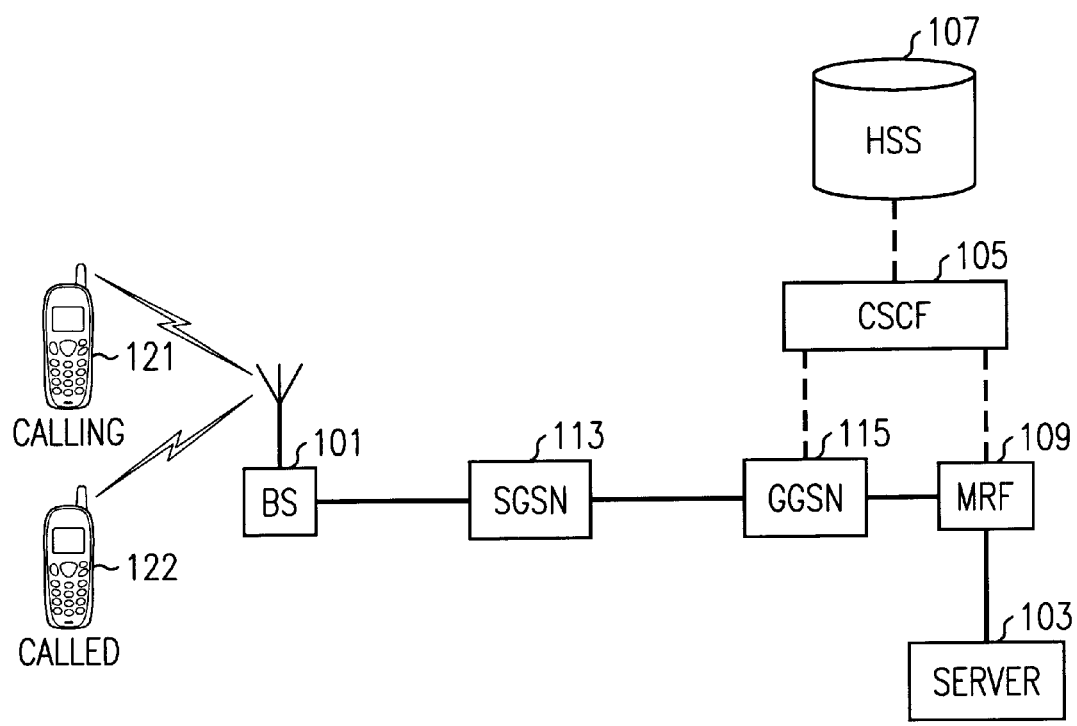
FIG. 1 depicts a communication system in accordance with the present invention.

The present invention can be better understood with reference to FIGS. 1 and 2. FIG. 1 depicts a communication system 100 in accordance with the present invention. In an exemplary embodiment depicted in FIG. 1, communication system 100 is a Third Generation (3G) wireless system. Communication system 100 can alternately be any digital cellular system. 3G wireless systems include multiple air interface standards, including cdma2000, Wideband CDMA (W-CDMA), and UWC-136, a Wideband TDMA technology.

Communication system 100 includes a base station 101, server 103, a call processing control entity (Call Session Control Function (CSCF) 105), a subscriber database (Home Subscriber Server (HSS) 107), a Multimedia Resource Function (MRF) 109, a Serving GPRS Support Node (SGSN) 113, and a Gateway GPRS Support Node (GGSN) 115. It should be understood that wireless system 100 typically includes a plurality of base stations, but only one, base station 111, is depicted for clarity.

FIG. 1 also depicts three wireless units, a calling phone 121, a called phone 122, and a first phone 123. Communication system 100 can support a plurality of wireless units, but only three wireless units are depicted for clarity. Phones 121–123 are depicted in FIG. 1 as wireless units, but can alternately be landline telephones or any other communication devices capable of generating or receiving a call request.

Base station 101 includes a transmitter and receiver and is disposed within a predetermined geographic region. Base station 101 communicates over the air utilizing Radio Frequency (RF) signals with calling phone 121 and called phone 122. The type of RF signaling utilized by base station 101 depends upon the air interface of communication system 100. Although FIG. 1 depicts calling phone 121, called phone 122, and first phone 123 as communicating with base station 101, it should be understood that phones 121–123 can be communicating with different base stations. In that scenario, the messages would traverse communication system 100 using known methods. Further, phones 121–123 can be wireline phones connected to communication system 100 via the PSTN, or a Packet Data Network (PDN) for other Session Initiation Protocol (SIP) enabled devices.

Server 103 includes a processor and is coupled to MRF 109. In an exemplary embodiment of the present invention, server 103 includes an automated speech recognition resource to convert a speech message to a data message and a text-to-speech converter to convert a data message to a speech message. In a second exemplary embodiment of the present invention, communication system 100 includes two servers, the first server including the automated speech recognition resource and he second server including the text-to-speech converter. Server 103 performs conversion of messages sent to and from calling phone 121 and called phone 122.

CSCF 105 is the call processing control entity in system 100. CSCF 105 provides bearer connection control for the call. HSS 107 is the subscriber database of communication system 100. HSS 107 is a database that stores the home location and the current location of wireless units within communication system 100. HSS 107 also stores a user profile, which includes the services to which a mobile unit subscribes.

MRF 109 is coupled to CSCF 105 via control and to GGSN 115 via bearer. MRF 109 provides an interface to the user for playing a message to the caller, stating the options available to the caller, receiving the caller's choice via an interaction with the calling party, and forwarding the caller's choice to CSCF 105.

Serving GPRS Support Node (SGSN) 113 is coupled to base station 101. SGSN 113 is primarily responsible for mobility management. SGSN 113 also wireless stations in the local area for the transmission and receipt of packets. SGSN 113 also locates and identifies the status of wireless stations and gathers crucial call information, an essential aspect of billing. SGSN 113 also provides the functions of ciphering, compression and other services.

Gateway GPRS Support Node (GGSN) 115. GGSN 115 is coupled to the PSTN via a Media Gateway. GGSN 115 provides packet routing and transfers, assisting in mobility management in conjunction with SGSN 113, quality of service functionality, authentication, and system management functionality.

FIG. 2 depicts a flow chart 200 of a call flow for sending a data message from a called phone to a calling phone while communicating with a first phone in accordance with the present invention. A calling phone sends (201) a call request to a called phone. The call request is typically generated by pressing an identifier, such as the directory number, associated with the called phone. The call request is a request for the called phone to establish a voice communication by answering the call request. As used herein, the term call refers to an action taken by a calling phone to establish a connection with a called phone in a dial-up network. In an exemplary embodiment, the call request includes an indication of whether the calling phone is capable of receiving a data message. This is preferably determined when the identification of the calling phone is a SIP Uniform Resource Locator (URL), such as "user@serviceprovider.com". The indicator can also include the type of data that is capable of being received, such as packetized voice data, multimedia data, video, or other types of data.

In a second exemplary embodiment, the call request includes an indicator that the calling phone is not capable of receiving a data message. This information can be used by the communication system in determining what type of response to send to the calling phone and where to send the response. For example, if the calling phone is unable to receive a data message, system resources would be wasted if the called phone were to send a multimedia message to the calling phone in response to the call request. In this example, the called phone would send a voice message to the calling phone.

The communication system determines (203) if the called phone is involved in an active call. A phone is considered to be involved in an active call when the two phones are currently capable of sending and receiving signals to and from the other phone involved in the call. For example, a call is not an active call when either party to the call is on hold. If the called phone is not involved in an active call, the communication system performs (204) normal call processing in accordance with the prior art. The process then ends (299).

If the called phone is involved in an active call as determined at step 203, the communication system determines (205) if the called phone has call waiting activated. Call waiting is a feature offered by service providers that allows a user to be alerted to an incoming call request while engaged in a current call. In order to have call waiting activated, the user must subscribe to the call waiting service and must not have disabled the call waiting feature. For example, in current communication systems, a user can disable call waiting when making a call by pressing a predetermined key sequence, commonly *70, prior to entering the directory number of the phone to which they are calling. In this manner, the phone will appear during the length of this call to not have the call waiting feature.

If the communication system determines at step 205 that the called phone does not have call waiting activated, the system generates (206) a busy signal to the calling phone and performs known steps to free resources from the call request. The process then ends (299).

If the communication system determined at step 205 that the called phone does have call waiting activated, the communication system determines (207) if the called phone has the caller ID feature. Caller ID is a service that sends the caller's telephone number to the party that is being called. A digital readout on the telephone or other device is required to view the number. In typical caller ID setups, the called party has displayed the name and directory number of the calling party. Caller ID requires subscription to the service with the service provider as well as a phone that is capable of receiving and displaying the caller ID information.

If the called phone does not have the caller ID feature as determined at step 207, the communication system generates (208) the call waiting indication at the called phone. The call waiting indication is typically an audible beep that is played over the called phone.

If the called phone has the caller ID feature, the call waiting with caller ID functionality will be performed. The communication system displays (209) the caller ID information on the called phone. This is preferably done by including the caller ID information in out-of-band signaling via SIP messaging. For example, the caller ID information can be included in the original SIP INVITE message. Alternately, the communication system can display the caller ID information by sending in-band signaling to the called phone including the name and phone number of the calling phone. The called phone has to be capable of processing and displaying the caller ID information.

After alerting the called phone of the call waiting request, either audibly at step 208 or audibly and visually at step 209, the communication system determines (211) if the called phone wishes to send data to the calling phone in response to the call request. This determination is preferably made by receiving a predetermined series of keystrokes from the called phone. For example, the called phone may hit *99, or any other predetermined sequence of digits, which indicates to the communication system that the called phone whishes to send a data message to the calling phone while maintaining and staying active in the current call.

The communication system then collects (213) a data message from the called phone. The called phone may store a number of prerecorded data messages. For example, a first stored message may indicate that the called phone is engaged in a current call and will call back the calling phone when the current call has ended. Examples of other prerecorded response data messages include, but are not limited to, messages indicating that the called party will call back when returning home or to the office, that the calling party should call again in a few minutes, that the called party is involved in an important call and should not be disturbed, as well as many others.

In addition, the called party may compose dynamic data messages in response to the call request. For example, the called phone may enter a dynamic response data message via the keypad of the called phone. If the called phone is a part of a personal computer or the like, the user of the called phone can compose a dynamic data message via the keyboard of the personal computer.

The calling phone also determines if the calling phone is data capable. This is preferably done by checking the indicator that was included in the call request sent from the calling phone. Alternately, this information can be stored by the communication system and retrieved at this point to determine whether the calling phone is data-capable. If the calling phone is capable of receiving data messages, the called phone forms the data message. Alternately, the default can be set such that the called phone sends a data message in response to the call request from the calling phone. If the calling phone is not data capable, the data response would not be effectively processed by the calling phone, and the calling phone would act in the same way as if no action was taken by the called phone in response to the call request.

The communication system then sends (215) the data message from the called phone to the calling phone while keeping the current call active. As used herein, a call is maintained as active when the parties remain in active communication without either party being placed on hold. In other words, when both party are engaged in continuous full-duplex communication with each other. In typical call waiting operation, a called phone is engaged in a call with a first phone. When a call request comes in for the called phone during the call, the called phone has to suspend the current call by effectively placing the first phone on hold while going to answer the incoming call waiting request. When the new call waiting call is finished, the called phone can go back to the first phone, take the first phone off hold, and resume the call.

Utilizing the present invention, conversely, the called phone maintains the active communication with the first phone while sending a data response message in response to the call request from the calling phone. In this manner, the called phone can maintain the active call with the first phone while communicating in a separate session with the calling phone. The data message from the called phone can be converted, or the called phone may send the data message directly to the server. When the data message needs to be converted, the server converts the data message into a speech message, preferably by utilizing a text-to-speech converter. The server then sends the speech message to the calling phone.

Once the data message is sent to the calling phone, the calling phone can send a response data message to the called phone. This message is sent in response to the data message and can be received by the called phone and the data session between the called phone and the calling phone can be maintained. The response data message may indicate that the calling phone has received the data message, or can be a message including a response to the data message sent from called phone to calling phone. If the calling phone is data capable, the response data message is preferably sent directly to the called phone. If the calling phone is not data capable, the calling phone can send a voice response message to a server, which converts the voice response message to a response data message and forwards the response data message to the called phone. The server preferably uses an automated speech recognition resource to convert the speech message to data. The speech-to-text converter and the text-to-speech converter can be located in the same server, or can be located in different processors within the communication system.

In an exemplary embodiment of the present invention, the data message includes an invitation for the calling phone to enter the active communication between the called phone and the first phone. In this manner, the called phone asks the calling phone if the calling phone would like to enter the active call and make the call into what is commonly referred to as a conference call or three-way call. In this embodiment, the calling phone can send a response data message to the called phone accepting the invitation to join the active call. At this point, the communication system adds the calling phone to the active call to thereby form a conference call between the calling phone, the called phone, and the first phone.

In this exemplary embodiment, the calling phone may desire or have the capability of only certain levels of service. Quality of Service (QoS) refers to the ability to define a level of performance in a data communications system. QoS ensures optimum performance for traffic, such as real-time voice and video. The present invention allows the QoS of a call to change based upon the QoS level of the calling phone. For example, if the calling phone has initiated a call request for a high QoS session, such as a video or other multimedia session, the called phone may be involved in an active call with a first phone that has a low QoS, for example a voice call. In this scenario, the invitation to the calling phone to join the active call between the called phone and the first phone may be an invitation for a lower Quality of Service session.

Similarly, if the calling phone initiates a call request to the called phone for a low QoS session, such as a voice call, while the called phone is involved in an active call with a first phone that has a higher QoS, such as a multimedia call, the invitation for the calling phone to join the active call may be for a higher Quality of Service session. The process then ends (299).

Thus, the present invention provides a method and communication system for allowing a called phone to maintain an active communication with a first phone while sending a data message to a calling phone in response to a call request received from the calling phone. By maintaining the active call between the first phone and the calling phone, the communication system allows the called phone to effectively communicate with the calling phone without having to place the first phone on hold.

While this invention has been described in terms of certain examples thereof, it is not intended that it be limited to the above description, but rather only to the extent set forth in the claims that follow.

We claim:

1. A method for providing data communication between a calling phone and a called phone, the method comprising the steps of:
    receiving a call request at the called phone while the called phone is connected to a first phone and engaged in an active communication with the first phone; and
    sending a data message that includes an invitation for the calling phone to enter the active communication between the called phone and the first phone from the called phone to the calling phone while maintaining the active communication between the called phone and the first phone, wherein the invitation is for a session having a different Quality of Service than the current session.

2. A method for providing data communication between a calling phone and a called phone in accordance with claim 1, wherein the invitation is for a lower Quality of Service session.

3. A method for providing data communication between a calling phone and a called phone in accordance with claim 1, wherein the invitation is for a higher Quality of Service session.

4. A method for providing data communication between a calling phone and a called phone in accordance with claim 1, the method further comprising the step of converting the data message into a speech message.

5. A method for providing data communication between a calling phone and a called phone in accordance with claim 4, wherein the step of converting the data message into a speech message comprises the step of utilizing a text-to-speech converter.

6. A method for providing data communication between a calling phone and a called phone in accordance with claim 1, wherein the step of receiving a call request at the called phone comprises the step of receiving a call request that includes an indicator that the calling phone is capable of receiving a data message.

7. A method for providing data communication between a calling phone and a called phone in accordance with claim 1, wherein the step of receiving a call request at the called phone comprises the step of receiving a call request that includes an indicator that the calling phone is capable of receiving a multimedia message.

8. A method for providing data communication between a calling phone and a called phone in accordance with claim 1, the method further comprising the step of receiving a response data message at the called phone from the calling phone during the active communication in response to the data message.

9. A method for providing data communication between a calling phone and a called phone in accordance with claim 8, the method further comprising the steps of:
    sending a response message from the called phone, the response message being a voice message;
    receiving the response message at a server;
    converting the response message to a data message to produce a response data message; and
    sending the response data message to the calling phone while maintaining the active communication between the first phone and the called phone.

10. A method for providing data communication between a calling phone and a called phone in accordance with claim 9, wherein the step of converting the response message to a data message comprises convening the response message utilizing an automated speech recognition resource.

11. A method for providing data communication between a calling phone and a called phone in accordance with claim 1, further comprising the step of providing the called phone with an option of sending a data response while maintaining the active communication between the first phone and the called phone prior to sending the data message from the called phone to the calling phone.

12. A communication system comprising:
    a calling phone that sends a call request to establish a voice communication by answering the call request; and
    a called phone that receives the call request from the calling phone while the called phone is connected to a first phone and engaged in an active communication with the first phone and responds with a data message that includes an invitation for the calling phone to enter the active communication between the called phone and the first phone to the calling phone while maintaining the active communication between the called phone and the first phone, wherein the invitation is for a session having a different Quality of Service than the current session.

13. A communication system in accordance with claim 12, the communication system further comprising a server that intercepts the data message, converts the data message to a speech message, and sends the speech message to the calling phone.

14. A communication system in accordance with claim 12, wherein the invitation is for a lower Quality of Service session.

15. A communication system in accordance with claim 12, wherein the invitation is for a higher Quality of Service session.

* * * * *